United States Patent
Kim

(10) Patent No.: US 6,257,210 B1
(45) Date of Patent: Jul. 10, 2001

(54) COMPRESSED NATURAL GAS (CNG) FUELING SYSTEM FOR CNG VEHICLES

(75) Inventor: Yu-Kyeom Kim, Suwon (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/420,043

(22) Filed: Oct. 18, 1999

(30) Foreign Application Priority Data

Feb. 9, 1999 (KR) .................................. 99-4413

(51) Int. Cl.[7] .................................................. F02B 43/00
(52) U.S. Cl. .............................................. 123/529; 137/203
(58) Field of Search .................................. 123/527, 529; 137/203, 204

(56) References Cited

U.S. PATENT DOCUMENTS

| | | | |
|---|---|---|---|
| 5,012,781 | * 5/1991 | Yokoyama et al. | 123/353 |
| 5,367,999 | * 11/1994 | King et al. | 123/458 |
| 5,584,467 | * 12/1996 | Harnett et al. | 251/129.07 |
| 5,699,767 | * 12/1997 | Notsu et al. | 123/323 |
| 5,809,970 | * 9/1998 | Smith et al. | 123/438 |
| 5,893,385 | * 4/1999 | Igarashi | 137/203 |

* cited by examiner

Primary Examiner—Noah P. Kamen
Assistant Examiner—Hai Huynh
(74) Attorney, Agent, or Firm—Christie, Parker & Hale, LLP

(57) ABSTRACT

A CNG fueling system includes a plurality of CNG tanks for storing compressed natural gas, a supply pipe for connecting the tanks to a combustion chamber of a internal combustion engine, valves provided in the supply pipe, a low pressure regulator for regulating low pressure, and a gas mass sensor for sensing the mass of the gas. The CNG fueling system further includes a lubricant drainage device connected with the low pressure regulator for draining lubricant that has infiltrated into the system.

7 Claims, 4 Drawing Sheets

COMPRESSED NATURAL GAS (CNG) FUELING SYSTEM FOR CNG VEHICLES

BACKGROUND OF THE INVENTION (a) Field of the Invention

The present invention relates to fueling systems for vehicles, and, more particularly, to a CNG-vehicle fueling system having a lubricant drainage device for preventing infiltrated lubricant from causing system elements not to function properly.

(b) Description of the Related Art

The use of natural gas as an alternative fuel for motor vehicles has economical and ecological advantages because natural gas is less costly and cleaner burning than gasoline or diesel. However, use natural gas as a fuel for a motor vehicle, a CNG fueling system must be provided for the vehicle.

FIG. 5, shows a conventional CNG fueling system. As shown in FIG. 5, the conventional CNG fueling system including a CNG tank 102 and a flow line 104 which connects the CNG tank 102 and an internal combustion engine (not shown in the drawing), along which a high-pressure regulator 106 for regulating high-pressure gas from CNG tank 102, a solenoid valve 108 which is opened or closed according to signals from a electronic control unit (ECU), a low-pressure regulator 110 for regulating low-pressure gas, a gas mass sensor 112 for detecting the amount of the gas flow, and a flow controller 114 for adjusting the gas introducing into the engine. The CNG tank 102 is also provided with a connector 116 to be connected with a gas charger.

However, the CNG fueling system has drawbacks in that when charging the CNG, lubricant infiltrates into system elements such as the low-pressure regulator 110, the gas mass sensor 112, the flow controller 114, and even into a combustion chamber of a vehicle engine due to the high charging pressure. This lubricant infiltration can cause system elements not to function properly. Accordingly, engine performance deteriorates, especially related to the generation of toxic has due to the combustion of these infiltrated lubricants in the engine.

SUMMARY OF THE INVENTION

The present invention has been made in an effort to solve the above problems of the prior art.

It is an object of the present invention to provide a CNG fueling system for preventing lubricant from infiltrating into system elements and combustion chamber so as to avoid the malfunction of other devices which deteriorate engine performance and in order to reduce toxic gases causing by burning lubricant.

To achieve the above object, the CNG fueling system of the present invention comprising a plurality of CNG tanks for storing compressed natural gas, a supply pipe for connecting the tanks to a combustion chamber of a internal combustion engine, valves provided with the supply pipe, a low pressure regulator for regulating low pressure, and a gas mass sensor for sensing the mass of the gas. The CNG fueling system further comprises a lubricant drainage device connected with the low pressure regulator for draining lubricant that has infiltrated into the system, the lubricant drainage device comprising a lubricant separator provided in the low pressure regulator for separating the lubricant from the gas by generating a vortex, a drainage tank for storing the lubricant from the low pressure regulator, a drainage pipe connecting the low pressure regulator at its bottom surface with the drainage tank so as the lubricant drain to the drainage tank, and a lubricant discharge means for discharging the lubricant in the drainage tank, if the lubricant reaches a predetermined level.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
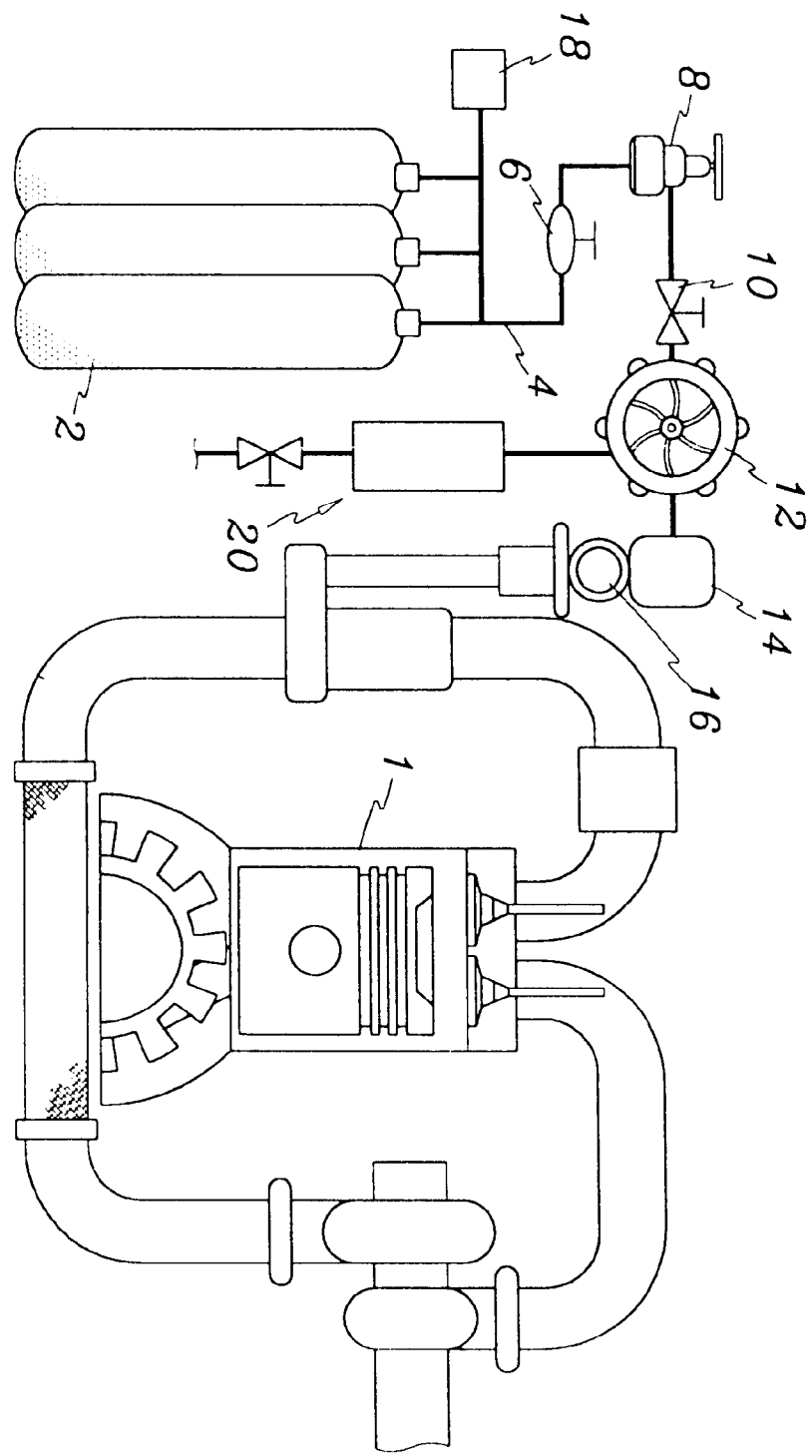
FIG. 1 is a front plane view of a CNG fueling system according to a preferred embodiment of the present invention.

FIG. 1 shows the CNG fueling system according to the preferred embodiment of the present invention.

As shown in FIG. 1, the CNG fueling system comprises a plurality of CNG tanks, a supply pipe 4, a manual valve 6, a high pressure regulator 8, a solenoid valve 10, a low pressure regulator 12, a gas mass sensor 14, and a flow controller 16. The CNG tanks are connected with a combustion chamber of internal combustion engine 1 via supply pipe 4. The manual valve 6, the high-pressure regulator 8, the solenoid valve 10, the low pressure regulator 12, the gas mass sensor 14, and the flow controller 16 are provided in the supply pipe 4. The CNG tanks 2 have a connector 18 in common which is used to connect with a gas charger.

The high-pressure regulator 8 is positioned downstream of the manual valve 6 for adjusting the high pressure of the gas from the CNG tanks 2. The low-pressure regulator 12 for adjusting the low pressure of the gas is positioned downstream of the high-pressure regulator 8, and the solenoid valve 10 which is opened or closed according to signals from an ECU (not shown) is positioned between the high and low pressure regulators 8 and 12. Downstream of the low-pressure regulator 12, the gas mass sensor 14 for detecting a flow amount and sending signals to the ECU and the flow amount controller 16 for adjusting the flow amount are positioned one after the other. The low pressure regulator 12 is provided with lubricant drainage device 20 for draining lubricant infiltrating from a gas charger through the supply pipe 4. The lubricant infiltration is caused by high charging pressure.

Figure 2:
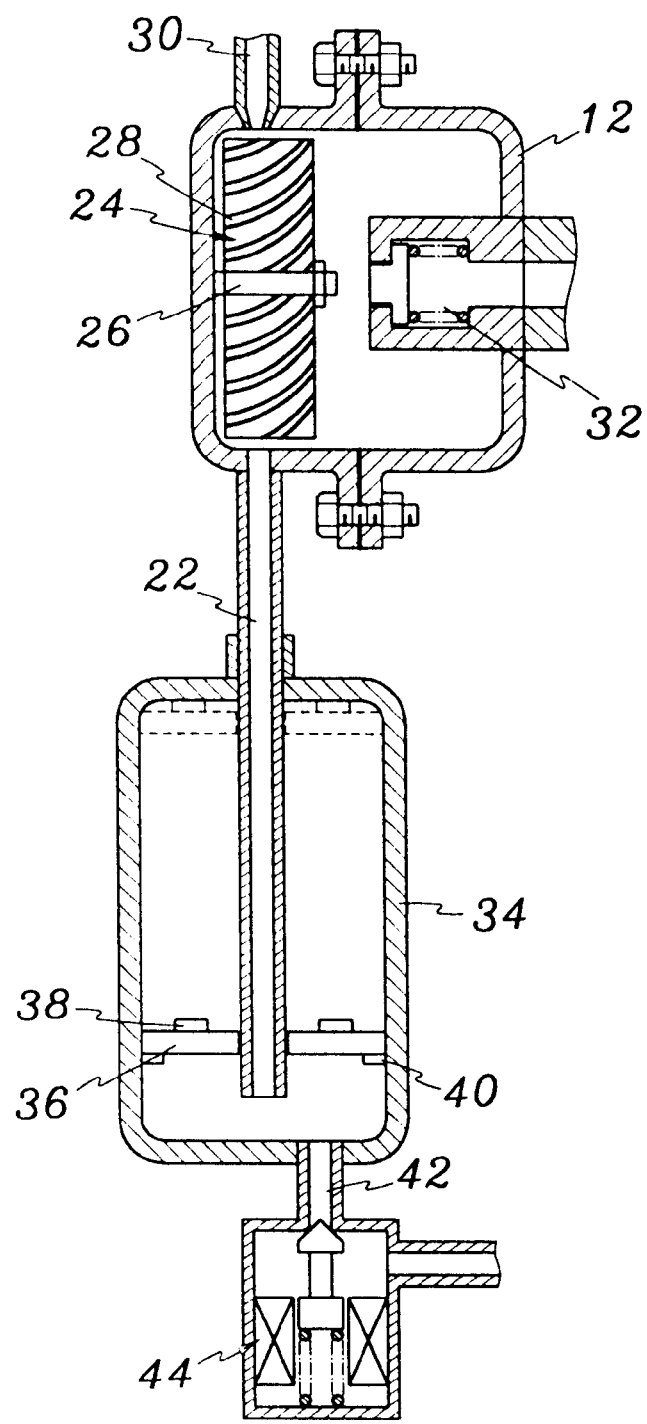
FIG. 2 is a sectional view of a lubricant drainage device provided in the CNG fueling system according to the preferred embodiment of the present invention.
Figure 3:
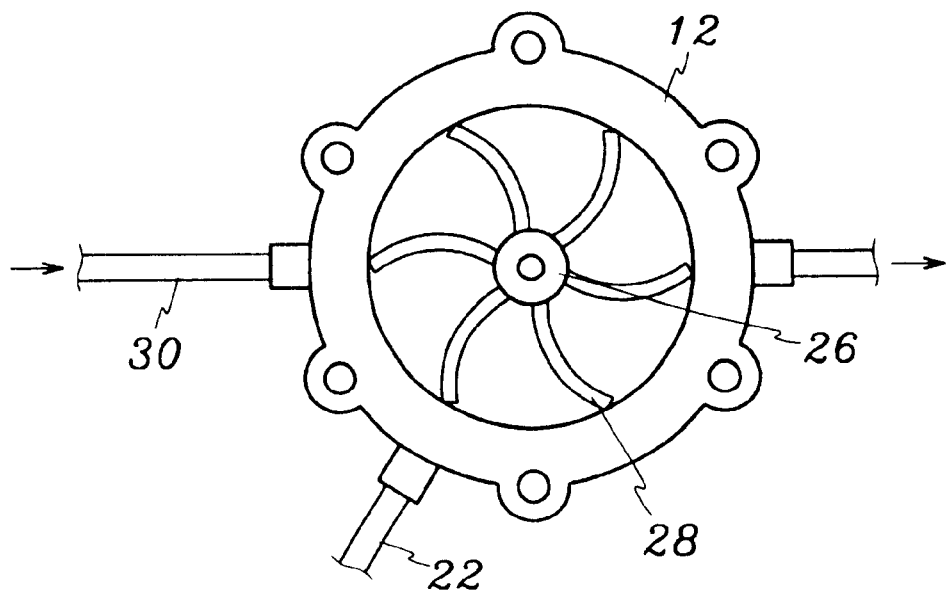
FIG. 3 is a detailed front view of a low pressure regulator provided in the lubricant drainage device of FIG. 2.

As shown in FIG. 2, the lubricant drainage device 20 comprises a lubricant separator 24 for separating lubricant from the gas, a drainage pipe 22 connected to the low pressure regulator 12, and a drainage tank 34 for storing the lubricant coming from the low pressure regulator 12 through drainage pipe 22.

The lubricant separator 24 is a rotary fan having a plurality of blades and rotatably mounted on its axle 26, one end of which is fixed on an inner wall of the low-pressure regulator 12 such that when a mixture of the gas and the lubricant is introduced into the low-pressure regulator 12 through the opening 30, the fan 24 generates a vortex by rotating under the pressure of the gas, resulting in that the lubricant goes to the bottom of the low pressure regulator 12 due to gravity and the gas is sent out through a pressure control valve 32.

The drainage pipe 22 is connected at one end to the bottom of the low pressure regulator 12 and its other end is deeply inserted near to the bottom of the drainage tank 34 for guiding the lubricant to the drainage tank 34. In the drainage tank, a buoy 36 is provided circumferencially around the part of the drainage pipe 22 that is inserted into the drainage tank 34. On the upper surface of the buoy 36, a lubricant level sensor 38 is mounted for detecting the lubricant level, and a stopper 40 is formed to catch the lower surface of the buoy 36 so as to keep the buoy 36 at a set distance from the bottom of the drainage tank 34 even when the lubricant level is the lowest point. That is, by maintaining at least a minimum amount of lubricant in the bottom of the drainage tank 34 and always keeping the end of the drainage pipe 22 dipped into the lubricant, the gas in the low pressure regulator 12 is prevented from being introduced into the drainage tank 34 via the drainage pipe 22.

Figure 4:
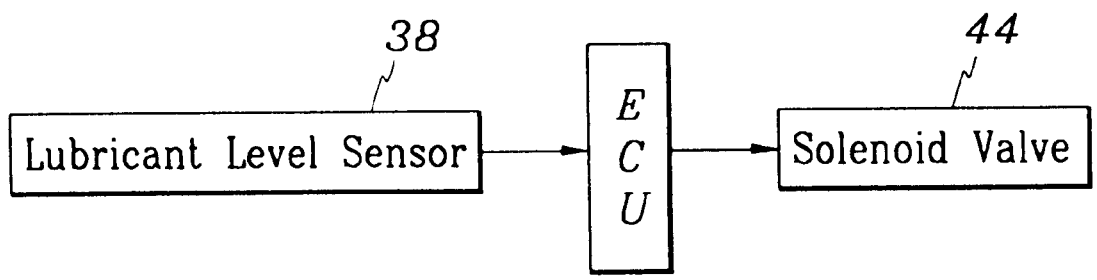
FIG. 4 is a block diagram of the CNG fueling system according to the preferred embodiment of the present invention.
Figure 5:
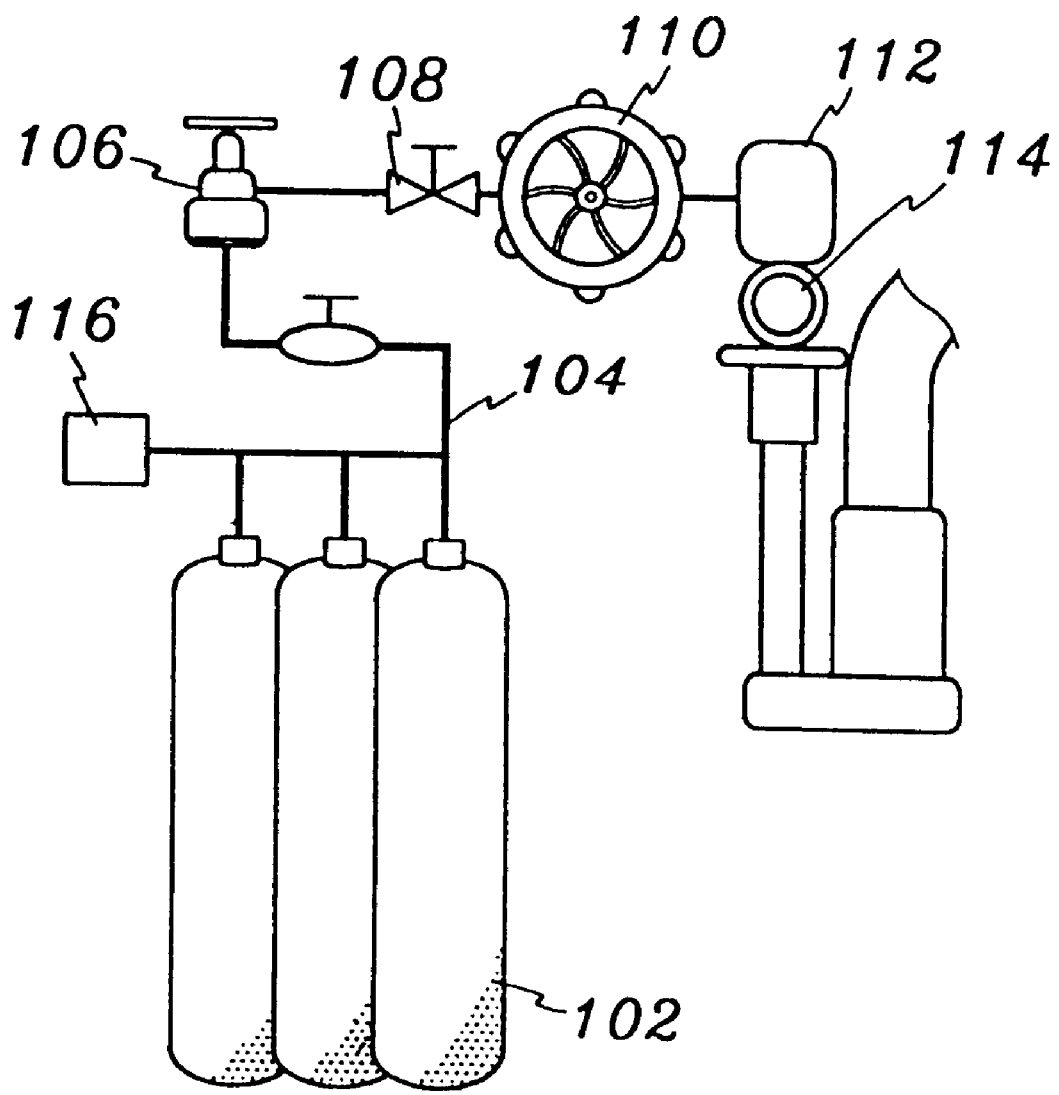
FIG. 5 is a front plane view of a CNG fueling system of a prior art.

As lubricant flows into the drainage tank 34, the buoy 36 floats up and if the lubricant is over a predetermined level, the lubricant is discharged out through a discharge pipe 42. That is, as shown in FIG. 4, if the buoy 36 floats up to the predetermined level, the lubricant level sensor 38 mounted on the upper surface of the buoy 36 detects the lubricant level and sends a signal to the ECU. Then, the ECU permits a solenoid valve 44 to be electrically energized so that the solenoid valve 44 can be opened to discharge the lubricant outside the system.

As shown in the preferred embodiment according to the present invention, the CNG fueling system is provided with a lubricant drainage device which is connected with the low pressure regulator such that if the lubricant infiltrates into the system through the supply pipe, the infiltrated lubricant can be drained to the drainage tank and discharged out of the system. Accordingly, malfunctions caused by infiltrated lubricant in the gas mass sensor and the flow controller can be prevented so that the engine performance improves. Also, since the lubricant can not reach the combustion chamber of the engine, toxic gas in exhaust can be drastically reduced.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A CNG fueling system comprising:
   a plurality of CNG tanks for storing compressed natural gas;
   a supply pipe for connecting the tanks to a combustion chamber of an internal combustion engine;
   control valves coupled to the supply pipe;
   a low pressure regulator for regulating low pressure gas flow;
   a gas mass sensor for sensing the mass flow rate of the gas; and
   a lubricant separator coupled to the low pressure regulator, wherein lubricant is separated from the gas by a vortex generator, the separator including a drain for draining the separated lubricant from the system.

2. The CNG fueling system of claim 1, wherein the vortex generator is a rotary fan.

3. A CNG fueling system comprising:
   a plurality of CNG tanks for storing compressed natural gas;
   a supply pipe for connecting the tanks to a combustion chamber of an internal combustion engine;
   control valves coupled to the supply pipe;
   a low pressure regulator for regulating low pressure gas flow;
   a gas mass sensor for sensing the mass flow rate of the gas; and
   a lubricant drainage device coupled to the low pressure regulator, the drainage device comprising:
      a lubricant separator provided in the low pressure regulator for separating lubricant from the gas by generating a vortex;
      a drainage tank for storing separated lubricant;
      a drainage pipe connecting the low pressure regulator with the drainage tank, wherein lubricant may drain from the regulator to the tank; and
      means for discharging the lubricant from the drainage tank when the lubricant reaches a predetermined level.

4. The CNG fueling system of claim 3, wherein the lubricant separator comprises a rotary fan disposed within the low pressure regulator, the fan rotating according to the pressure of the gas flowing into low pressure regulator.

5. The CNG fueling system of claim 4, wherein the lubricant separator generates a vortex which separates the lubricant from the gas.

6. The CNG fueling system of claim 4, wherein the drainage tank further includes:
   a buoy, the buoy adapted to slide along the drainage pipe and being further adapted to receive the fluid level sensor;
   positive stops located at a predetermined distance from the bottom of the drainage tank, wherein the stops prevent the buoy from falling below a minimum height from the bottom of the drainage tank; and
   the drainage pipe extending a predetermined distance below the positive stops.

7. The CNG fueling system of claim 3, wherein the means for discharging the lubricant comprises:
   a lubricant level sensor;
   a discharge pipe; and
   a solenoid valve, the solenoid valve adapted to open and close the discharge pipe in response to a signal from the lubricant level sensor.

* * * * *